United States Patent [19]

Leitz et al.

[11] 4,175,365
[45] Nov. 27, 1979

[54] METHOD AND APPARATUS FOR MEASURING DISTANCES

[75] Inventors: Ludwig Leitz; Knut Heitmann; Eckart Schneider, all of Wetzlar; Horst Schmidt, Nauborn, all of Fed. Rep. of Germany

[73] Assignee: Ernst Leitz Wetzlar GmbH, Wetzlar, Fed. Rep. of Germany

[21] Appl. No.: 661,761

[22] Filed: Feb. 26, 1976

Related U.S. Application Data

[63] Continuation of Ser. No. 480,825, Jun. 19, 1974, abandoned, which is a continuation of Ser. No. 309,809, Nov. 27, 1972, abandoned.

[30] Foreign Application Priority Data

Nov. 26, 1971 [DE] Fed. Rep. of Germany ....... 2158761

[51] Int. Cl.² .............................................. G01C 3/08
[52] U.S. Cl. ......................................... 356/4; 356/28; 356/373; 356/375; 250/201
[58] Field of Search .................. 356/4, 5, 28, 163, 169, 356/373, 375; 250/201, 204, 237 G; 354/25

[56] References Cited

U.S. PATENT DOCUMENTS

| 3,398,665 | 8/1968 | John, Jr. et al. ....................... 356/4 |
| 3,499,711 | 3/1970 | Argyle ..................................... 356/5 |
| 3,553,455 | 1/1971 | Sato et al. .............................. 250/201 |
| 3,555,280 | 1/1971 | Richards, Jr. ......................... 250/201 |
| 3,634,695 | 1/1972 | Barringer ........................ 350/162 SF |
| 3,663,105 | 5/1972 | Anderson ................................ 356/4 |

OTHER PUBLICATIONS

M. Born et al., *Principles of Optics*, Pergamon Press, 1970, 4th Edition, pp. 480–485.
J. T. Ator, Applied Optics, vol. 5, No. 8, 8–1966.
L. M. Biberman, *Reticles in Electro-Optical Devices*, Pergamon Press, 1966, pp. 136–140.
J. T. Ator, Journal of the Optical Society of America, vol. 53, No. 12, 12–1963.
M. Francon, *Modern Applications of Physical Optics*, Interscience Publishers, 3–1963, pp. 65–71.

Primary Examiner—S. C. Buczinski
Attorney, Agent, or Firm—Gilbert L. Wells

[57] ABSTRACT

A method and apparatus for the automatic evaluation of stereoscopic images by the determination of the maximum degree of correlation of identical images of an object reproduced by two objectives, for example for a range finder, wherein the two images are superimposed on one and/or two position frequency filters (82, 21, 31, 32) identical in their structures; the respective superimposed signal produced is fed respectively to one photoelectric receiver (13,14,43,44); and the output signals of the photoelectric receivers are used for indicating and/or control purposes. In one embodiment the position frequency filter (82) is moved and the output signals are correlated with each other. In another embodiment the output signals are subtracted from each other.

6 Claims, 4 Drawing Figures

METHOD AND APPARATUS FOR MEASURING DISTANCES

The present application is a continuation of Application Ser. No. 480,825, filed June 19, 1974, now abandoned, which in turn is a continuation of Application Ser. No. 309,809, filed Nov. 27, 1972, now abandoned. Priority of Application P 21 58 761.1, filed Nov. 26, 1971 in the Patent Office of the Federal Republic of Germany is claimed under 35 U.S.C. 119. The certified copy of the priority document has been filed in prior application Ser. No. 309,809, filed Nov. 27, 1972.

Applicants incorporate by reference the disclosure of Application Ser. No. 306,535 of Leitz et al, filed Nov. 15, 1972, now U.S. Pat. No. 3,781,110, which shows the state of the art of Optical Range Finding Systems.

BACKGROUND OF THE INVENTION

The field of the invention is geometrical instruments of the straightline light ray type having multisight lines.

The invention is particularly related to a method and apparatus for the automatic scanning of stereopairs for the purpose of stereoscopically measuring the reproduced object.

It is known to associate the two objectives of a range finder with television cameras, by means of which the images of the article to be measured, formed by the objectives, are scanned in a pointwise manner in a cyclic succession. The time-variable output signals obtained are compared in electronic correlation computers and the signal produced is used for indication and/or adjustment control.

Furthermore, it is no longer novel in evaluators for stereophotogrammetric recordings in one plane to superimpose a positive image and a negative image of the object being photographed, and to produce a signal by light-sensitive scanning means where the signal is used for eliminating the parallax between the negative and the positive and thus information is yielded regarding the spatial position of the object being scanned.

A device is also known which is based on the summation of the output signals of photoelectric receivers subdivided into strips, wherein respectively the signals of two strips are added that are identical with respect to their relative position to the image. This arrangement is difficult to realize inasmuch as the manufacture of the required special photoelectric receivers entails considerable difficulties.

SUMMARY OF THE INVENTION

Having in mind the limitations of the prior art, it is an object of the present invention to produce a novel method and apparatus for base range finding which provides good measuring results with a minimum of commercial expenditure.

According to the present invention, automatic evaluation of stereoscopic images is achieved with a determination of the maximum degree of correlation of two identical images of an object produced by two objectives, for example for a range finder, wherein the method, and apparatus therefore, are distinguished in that the two images are superimposed on one and/or two position frequency filters identical in their structures, the respective superimposed signal produced in this manner is fed preferably to respectively one photoelectric receiver, and the output signals of the photoelectric receivers are used for indicating and/or control purposes. In order to do this, the position frequency filter can be movable, and the output signals can be correlated with one another. It is also possible to subtract the output signals from each other.

The apparatus for conducting the method is further distinguished in that each of the objectives is associated with a filter for physically differing identification, and the images passing through the objectives are optionally imaged into one plane via means for beam deflecting. In this plane there is disposed, as a moving position frequency filter, a grating plate or an aperture stop; a beam splitter adapted to the effects of the filters is arranged after this grating and/or this aperture stop and this beam conducts the image portions associated with the objectives to separate photoelectric receivers. The outputs of the receivers are connected to the inputs of a correlation circuit with an indicating instrument connected thereafter. In this arrangement, a differentiating member can be inserted in the connecting line between one of the photoelectric receivers and the correlator.

In place of the moving grating plate, a fixed grid can be provided, and the two photoelectric receivers can be connected to the inputs of a differential amplifier. An indicating instrument is connected to the output of this amplifier.

It is likewise possible to connect to the two objectives two gratings joined in a rigid but adjustable manner, where these gratings have the effect of a position frequency filter and are identical in their structures. After each grating a photoelectric receiver is connected and the outputs of these two photoelectric receivers are connected to the input terminals of a differential amplifier with an indicator inserted thereafter.

Along these lines, at least one of the gratings can be fashioned as a polarizing grid and a beam splitter is connected thereto which conducts a portion of the light flux into an ocular for subjective observation. In this case, a polarizing filter is inserted in front of the associated photoelectric receiver.

In a further embodiment of the invention, at least one of the objectives is followed by a beam splitter which divides the beam of rays into two portions. One portion of the beam is imaged on one of the gratings, while the other portion is fed to an ocular for subjective observation. Advantageously, a visually detectable reference marker is inserted in the beam path in front of the ocular. It is likewise possible to connect an ocular after each of the objectives. In this case, the reference markers associated with the oculars are preferably rigidly coupled with the gratings.

Finally, the structures of the grating or gratings are formed to be aperiodical. The novel measuring process and/or devices for the conductance thereof are employed in all those cases where a spatial determination of distances is to be effected, i.e., for example, in distance measurements for photographic purposes, in photogrammetry, in the focusing of projectors, etc.

BRIEF DESCRIPTION OF THE DRAWINGS

The invention is best described by means of examples with reference to the drawings, to wit.

DESCRIPTION OF THE PREFERRED EMBODIMENTS

Figure 1:
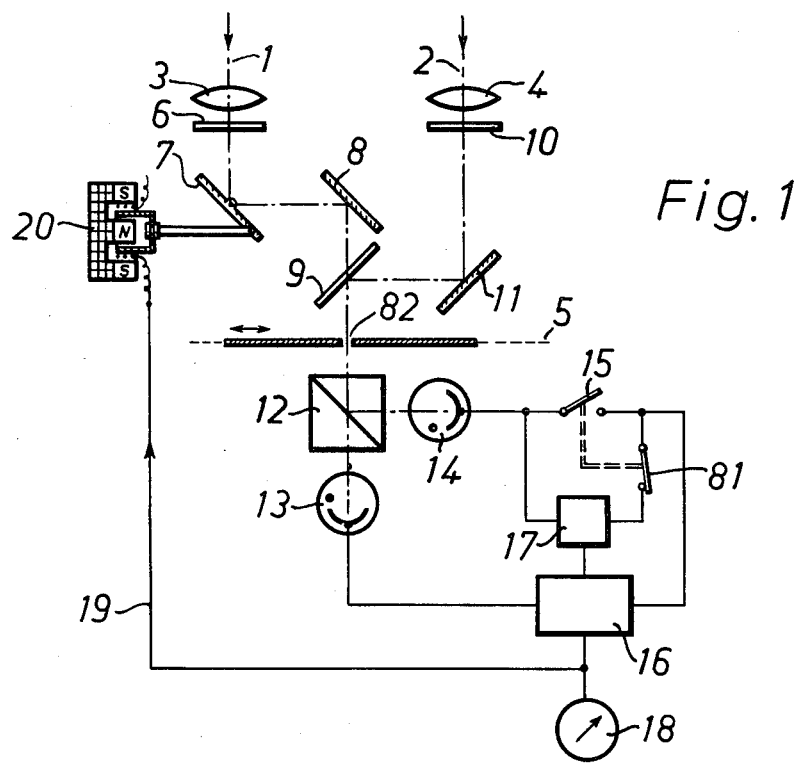
FIG. 1 shows in a schematic plan view, a novel device with two image-producing objectives and a scanner of simple geometry.

In FIG. 1, two light beams emanating from an object to be measured are denoted by reference numerals 1 and 2. Two superimposed object images are reproduced by the two objectives 3, 4 from the beams 1,2 in one plane 5. Beam 1 passes via a polarizing filter 6, a tiltable deflecting mirror 7, a further deflecting mirror 8, as well as a beam splitter 9, whereas the beam 2 passes via a polarizing filter 10 and a deflecting mirror 11, as well as via the beam splitter 9 so that both images assume complementary conditions in the plane 5. In this plane, an aperture stop 82 is disposed, the direction of the aperture being preferably at right angles to an imagined base line connecting the centers of the two objectives. This aperture stop is moved in the direction of the base by means of a drive means which is not shown. After passing the aperture 82, which can also be replaced by a corresponding grating, the beam portions are separated from each other by means of a beam splitter 12 and then fed to photoelectric receivers 13, 14 in correspondence with their origin from the two objectives. A correlation stage 16 is connected after these receivers, the output of this stage being connected to an indicating instrument 18. As can be seen, an interrupter switch 15 is inserted in the connection between the photoelectric receiver 14 and the correlator 16. A differentiating stage 17, connected in series with an interrupter switch 81, is connected in parallel with the interrupter switch 15. The two switches 15, 81 are coupled with each other so that they can connect the associated lines with each other only alternatingly. Furthermore, a control line 19 is connected to the correlator output. Via this control line, the mirror 7 is adjusted in its angle of incidence by means of a moving coil magnet system 20. This control device is arranged so that, in the condition of maximum degree of correlation, the two images are exactly congruent in the plane 5. The filters 6,10 can be fashioned differently with respect to the directions of polarization or with respect to colors. Of course, the beam splitter 12 is then adapted to the type of identification.

The correlator 16 having the designation NE 561 B and supplied by Signetics Corp. yields a signal which is a maximum upon an optimum correlation position of the two images in the plane 5, when the switch 15 is closed. Otherwise, due to the differentiation in member 17 having the designation differentiator and disclosed in Reference Data for Radio Engineers 1957 ITT-Corporation, New York, page 458 the correlator yields a zero signal transmission. If these extreme cases have not been reached as yet, then the image position is automatically adjusted to an optimum via the regulator 20, 7. This arrangement exhibits the advantage of being unequivocal as compared to other arrangements, since the required value at the output of the correlator 16 is reached in case of one, and only one, relative image position.

Figure 2:
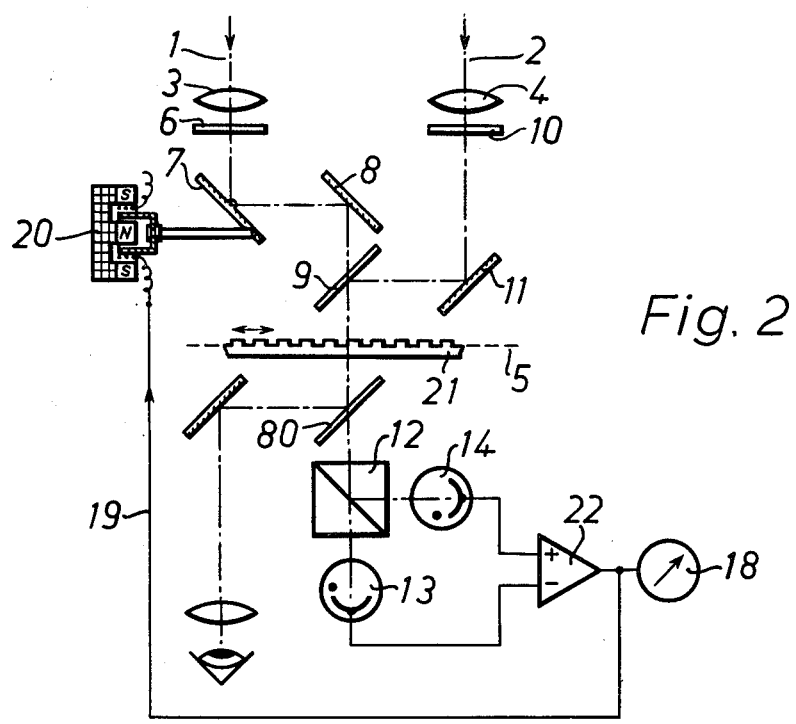
FIG. 2 shows in a schematic plan view, a device for scanning the image contents with simultaneous correlation.

In FIG. 2, the elements carrying reference numerals 1-5, 6-14, and 18-20 exhibit the same function as the corresponding components in FIG. 1. In place of the oscillating aperture 82, a grating 21 is provided in this embodiment. After splitting up of the two image components by the beam splitter 12, the two photoelectric receivers 13, 14, which are connected to the input terminals of a differential amplifier 22 disclosed in Reference Data 1957 ITT page 447, are excited. An indicating instrument 18 as well as a moving coil adjusting device 20, the latter via a line 19, are connected to the output of this amplifier.

The image signals are only identical, i.e. the output signal of the amplifier 22 exhibits a zero passage only when identical image points of the two images fall in identical grating strips or in grating strips shifted with respect to one another by whole grating intervals. The possibility of ambiguity results therefrom, which can, however, be avoided by an aperiodic structure of the grating 21. The advantage as compared to the arrangement of FIG. 1 is a higher light efficiency, so that this device can be employed for measuring even objects of a weaker light intensity. This advantage can be additionally enhanced by fashioning the strips of the grating 21 in a transparent polarizing manner. In this case, it is even possible to observe the mixed image of the object visually via a beam splitter 80 connected after the grating 21, without perceiving interfering grating structures. The automatic optimum adjustment of the relative image position can be effected analogously to FIG. 1.

Figure 3A:
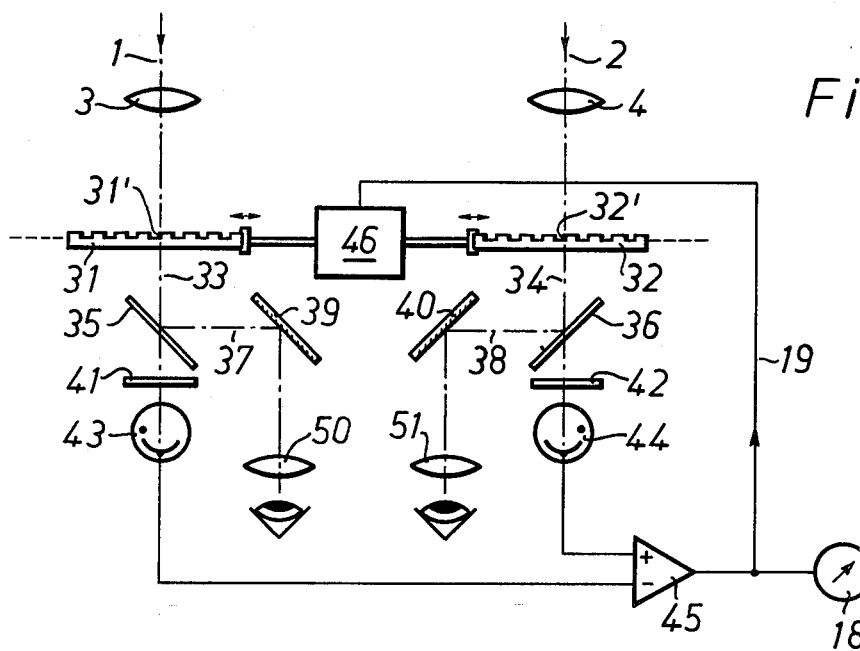
FIGS. 3a and 3b show embodiments of FIGS. 1 and 2 with two separate images and simultaneous visual observation.

In FIG. 3a, a further embodiment of the novel device is illustrated schematically. This arrangement exhibits the elements of FIG. 1, denoted by numerals 1-5, 18, 19, with an analogous function. The two object images are here reproduced on two separate gratings 31, 32 which are coupled with each other rigidly but variable in distance. These gratings have polarizing strips. From the filtered light beams 33, 34 and beam splitters 35, 36, the components 37, 38 are branched off and rendered visually observable, via deflecting mirrors 39, 40, and oculars 50, 51. The polarizing filters 41, 42 are adapted to the polarization directions of the gratings 31, 32. The remaining portion of the beams 33, 34 pass through these filters to photoelectric receivers 43, 44, and the output signals of the receivers are conducted to a differential amplifier 45. When the images are in the required position, the output signal of the amplifier 45 disappears. Otherwise, the grating 32 is automatically displaced into the required position by the output signal of the amplifier via a displacement member 46 comprising an electro-mechanical drive. The mechanical arrangement may have various forms. The principal components of such arrangements are disclosed for instance in: "Kinematik/Getriebelehre" by H. J. Knab, Buch- und Kunstdruckerei Erich Spandel, Nurnberg, 1930, FIGS. 423, 658 and 810. Such an arrangement is used in the Fototubus FFA-GW 512172 supplied by Leitz-Wetzlar. For visual stereoscopic observations via the deflecting mirrors 39, 40, a control marker moved analogously to the grating 32 can be provided which, upon the required adjustment, must be disposed in the image plane of the target object. In the present case, corresponding markers 31', 32' are applied to the gratings 31, 32 for this purpose.

Such target markers yield information regarding the fact whether the intended object is actually being measured. The ambiguity which is also present in this arrangement, analogously to that of FIG. 2, can again be eliminated, just as in the previous arrangement, by an aperiodical construction of the structures of the grating pairs 31, 32.

Figure 3B:
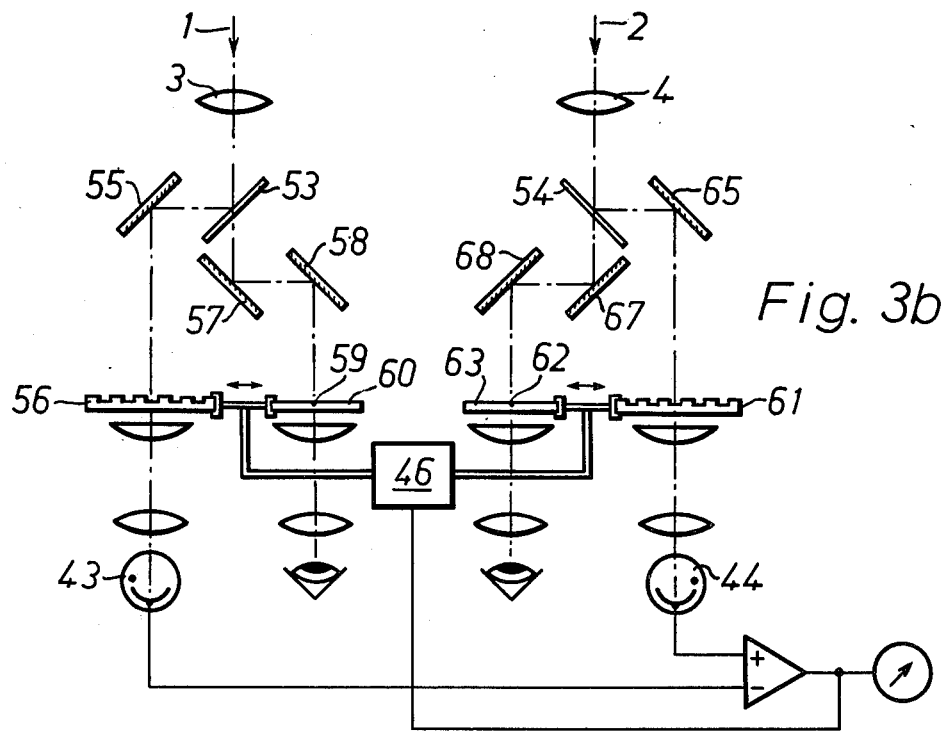

FIG. 3b represents an alternative to the arrangement shown in FIG. 3a. In this figure, a geometric beam splitter 53, 54 is connected in each instance to the objectives 3, 4, respectively. This beam splitter divides the beam of rays into two components. One component forms an image via a deflecting mirror 55 on a grating 56 and a photoelectric receiver 43 is connected after this grating. The other component forms an image via two deflecting mirrors 57, 58 in the plane of a graticule 60 provided with a marker 59, which is observed by means of an ocular 50. Correspondingly, the beam of rays passing through the objective 4 is divided by the beam splitter 54, and its components are reproduced, via a deflecting mirror 65, in the plane of a grating 61 and/or, via two deflecting mirrors 67, 68, in the plane of a graticule 63 provided with a marker 62 corresponding to the marker 59. A photoelectric receiver 44 is connected after the grating 61, and an ocular 51 is connected after the graticule 63. The grating 56 is rigidly connected to the graticule 60, and the grating 61 is rigidly joined to the graticule 63. The gratings 56, 61 are displaceable in parallel to each other by means of a drive gear comprising an electro-mechanical drive. The mechanical arrangement may have various forms. The principal components of such arrangements are disclosed for instance in: "Kinematik/Getriebelehre" by H. J. Knab, Buch- und Kunstdruckerei Erich Spandel Nurnberg, 1930, FIGS. 423, 658 and 810. Such an arrangement is used in the Fototubus FFA-GW 512172 supplied by Leitz-Wetzlar. The evaluation of the electrical signals obtained at the photoelectric receivers 43, 44 is analogously the same as in the embodiment of FIG. 3a.

We claim:

1. In an apparatus having an extended object of a plurality of discrete structures reproduced by a first objective having a first line of sight and a second objective having a second line of sight for the evaluation of stereoscopic images by the determination of the maximum degree of correlation of a first image reproduced by said first objective and a second image identical with the first reproduced by said second objective, the improvement comprising:
   (a) a first filter (6) positioned in the first line of sight and a second filter (10) positioned in the second line of sight to filter said images for physical characterization;
   (b) a first and second means for projecting unidirectionally the filtered images into a plane (5) along an image axis;
   (c) means provided with at least one specific spatial frequency component and located in said plane along said image axis, said means being adapted for comparing areal structures composed of a plurality of points in said images by optical correlation and generating from said comparison optically discernible signals indicative of the position of said object;
   (d) a beam splitter located along said image axis projecting said first image in a first direction and said second image in a direction at an angle of 90° to said first direction;
   (e) first and second photoelectrical means receiving said split images and generating first and second output signals, means for differentiating connected in series with said first photoelectrical means and and receiving said first output signals;
   (f) circuit means for an additional electrical correlation of said output signals connected to said second photoelectrical means and said means for differentiating;
   (g) means for indicating connecting to said circuit means; and
   (h) means for controlling the position of said first means for projecting.

2. In an apparatus having an extended object of a plurality of discrete structures reproduced by a first objective having a first line of sight and a second objective having a second line of sight for the steroscopic evaluation of images by the determination of the maximum degree of correlation of a first image reproduced by said first objective and a second image identical with the first reproduced by said objective, the improvement comprising:
   (a) first grating (31) positioned in the first line of sight and a second grating (32) positioned in the second line of sight and adapted for comparing areal structures composed of a plurality of points in both images by optical correlation, said gratings joined and having means for adjustment of their spatial separation perpendicularly to the line of sight;
   (b) means for photoelectrically receiving and generating output signals positioned in said first and second lines of sight after said gratings;
   (c) circuit means for differentially amplifying the amplitudes of said output signals connected to said means for photoelectrically receiving; and
   (d) means for indicating (18) connected to said means for differentially amplifying.

3. The apparatus of claim 2, wherein at least one of the objectives (3,4) is associated with a beam splitter (54) which splits the beam into two components and one component of the beam is reproduced on one of the gratings (61) while the other component is fed to an ocular (51) for subjective observation.

4. The apparatus of claim 2, wherein said grating means are first and second gratings (21,31,32;56,61) and said gratings are aperiodical and identical in pairs.

5. The apparatus of claim 2, wherein said gratings (31,32) are polarizing gratings, a beam splitter (35,36) each is connected after said polarizing grating conducting a portion of the light flux into an ocular (50,51) for subjective observation, and a polarizing filter (41,42) is connected in front of the associated photoelectric receiver (43,44).

6. The apparatus of claim 5, wherein a visually detectable reference marker (63) is inserted in the beam path in front of the ocular.

* * * * *